United States Patent [19]
Holden

[11] Patent Number: 5,825,613
[45] Date of Patent: Oct. 20, 1998

[54] TILTING DISPLAY WITH CABINET SEAL

[75] Inventor: Thomas J. Holden, Warrington, Pa.

[73] Assignee: Strongarm Designs, Inc., Horsham, Pa.

[21] Appl. No.: 896,136

[22] Filed: Jul. 17, 1997

Related U.S. Application Data

[60] Provisional application No. 60/040,218 Mar. 6, 1997.
[51] Int. Cl.$^6$ .................................. G06F 1/16; H05K 5/00
[52] U.S. Cl. ........................... 361/681; 248/919; 248/923
[58] Field of Search ..................... 361/681, 682, 361/683, 517, 518, 610; 248/917–923; 312/223.1, 223.2; 345/905; 364/708.1; 49/67, 393, 392

[56] References Cited

U.S. PATENT DOCUMENTS

| | | | |
|---|---|---|---|
| 3,878,644 | 4/1975 | Brown et al. | 49/67 |
| 3,990,186 | 11/1976 | Gebhard | 49/393 |
| 4,098,033 | 7/1978 | Mann | 51/426 |
| 5,109,573 | 5/1992 | Sherman . | |
| 5,157,577 | 10/1992 | Balaud et al. | 361/681 |
| 5,337,212 | 8/1994 | Bartlett et al. . | |
| 5,351,176 | 9/1994 | Smith et al. | 361/681 |
| 5,419,626 | 5/1995 | Crockett . | |
| 5,433,040 | 7/1995 | Morrison | 49/465 |
| 5,479,285 | 12/1995 | Burke . | |
| 5,544,450 | 8/1996 | Schmidt et al. | 49/419 |
| 5,548,430 | 8/1996 | Kuo . | |
| 5,559,670 | 9/1996 | Flint et al. . | |
| 5,636,101 | 6/1997 | Bonsall et al. | 361/681 |

*Primary Examiner*—Lynn D. Feild
*Attorney, Agent, or Firm*—Gregory J. Gore

[57] ABSTRACT

A tiltable viewing screen includes a display screen bezel used in conjunction with a special seal which permits the screen to be pivoted without losing the sealing effect between the environment and a sealed cabinet in which the screen is mounted. The bezel is provided with axles at each side located at the midpoint between top and bottom of the bezel which permit rotation about a horizontal midline. In order to provide a constant gap between the rectangular bezel and the cabinet wall as the bezel is tilted about its axis, the bezel is shaped along its top and bottom surface in a constant radius arcuate contour. The radius is defined by the distance between the outer surface of the bezel and the axis of rotation. Various sealing materials, including pile seal or an elastomeric gasket, may be used. The preferred embodiment includes an LCD computer monitor, however, different viewing panels may be mounted within the bezel.

15 Claims, 2 Drawing Sheets

TILTING DISPLAY WITH CABINET SEAL

Priority based upon Provisional Patent Application Ser. No. 60/040,218, filed Mar. 6, 1997, is hereby claimed.

1. Field of the Invention

This invention relates to enclosures which include a rotatable display element. More specifically, it relates to enclosures which require sealing from dust, water and other ambient contaminants.

2. Background of the Invention and Description of Prior Art

Cabinets which house sensitive components, such as electronic equipment, are required to seal their contents from environmental contaminants. These cabinets for electronic equipment also include display screens on their outer surface which must therefore include a seal between the display component and the wall of the cabinet. There is a problem, however, with lighting glare reflected from the surface of a display window or screen, such as a CRT or LCD screen. To solve this problem, the entire cabinet is often mounted on a pivotable horizontal axis so that the front surface which includes the screen may be tilted to prevent lighting glare in the direction of the viewer. This solution has its drawbacks, however, because it requires an extremely large and expensive support stand to carry the entire weight of the cabinet and its components to provide the desired tilt.

It is known to provide display screens which are rotatable within a surrounding bezel as shown in U.S. Pat. No. 5,559,670 issued to Flint et al. However, there is no known prior use of such a construction with capabilities to provide an effective seal between the screen and the bezel to mount such a bezel in the wall of a sealed cabinet.

SUMMARY OF THE INVENTION

In order to solve the problems in the art described above, the applicant has invented a cabinet with a display screen which is tiltable, yet which provides an effective seal between the inside and outside areas of the cabinet. This permits unwanted glare to be avoided by merely tilting the display screen without requiring any special support to suspend the entire cabinet structure on a pivoting axis.

The present invention employs a uniquely-shaped display screen bezel used in conjunction with special seal means affixed to the surrounding cabinet wall. The bezel is provided with axles at each side located at the midpoint between the top and bottom of the bezel which permit rotation about a horizontal midline. In order to provide a constant gap between the rectangular bezel and the cabinet wall as the bezel is tilted about its axis, the bezel is shaped along its top and bottom surfaces in an arcuate contour. The shape of the contour is defined by a constant radius taken from the axis of rotation.

One way of obtaining this structure is by fitting a metal bezel into a lathe and then spinning it along its intended axis of rotation. Cutting means are then applied in the usual metal-turning manner to shape the top and bottom surfaces. Rounded corners are provided by a cutting tool applied to the surface of the bezel in a separate step of the same metalworking operation. It has been found that by combining the resulting shaped bezel in an accurately formed cutout in the cabinet wall, a close tolerance between the pivoting bezel and the surface of the cabinet wall can be maintained. This gap is then filled by a seal.

The type of sealing material used is also important to the operation of the present invention. In one embodiment, the inside surface of the cabinet wall is provided with a groove which carries a soft sealing material, known in the trade generically as "pile seal". It has been found that this seal material provides an even coefficient friction with the outside surface of the bezel and is effective in sealing against dust and dirt from entering the interior of the cabinet. In another embodiment where a greater sealing effect is required, an elastomeric seal material in the form of a planar rectangular gasket is clamped against a shoulder along the rear side of the cabinet wall around the cutout. This material wipes across the arcuate surface of the bezel as it is tilted. In this embodiment, it is important that the gap between the cabinet wall and the bezel be much tighter than the previously described embodiment which utilizes the pile seal material.

More specifically, the applicant has invented a tilt frame display screen, comprising: a sealed enclosure having a front wall with a cutout therein; a bezel mounted within the cutout rotatable about a horizontal axis located across the middle of the cutout, the bezel having arcuately formed top and bottom surfaces with a radius of curvature taken from the axis of rotation; and seal means mounted to the cabinet wall which completely fills all spaces between the bezel and the wall. An LCD display screen is mounted within the bezel which includes two axles, one affixed to each side vertical surface. The axles are rotatably secured to the front wall. The seal means may be either pile seal or an elastomeric material in the form of a gasket. The pile seal is held within a groove which encircles the cutout in the enclosure wall. In the case of the use of elastomeric material, the gasket is secured to the back side of the wall by a clamp.

It is therefore the primary object of the present invention to provide a sealed enclosure for holding electronics associated with a display screen in which the display screen may be tilted about a horizontal axis while maintaining the contents of the enclosure sealed from dirt, dust and other contaminants on the outside of the enclosure. Other objects, advantages and novel features of the invention will become apparent from the following detailed description of the invention when considered in conjunction with the accompanying drawings.

DESCRIPTION OF THE PREFERRED EMBODIMENT

Figure 1:
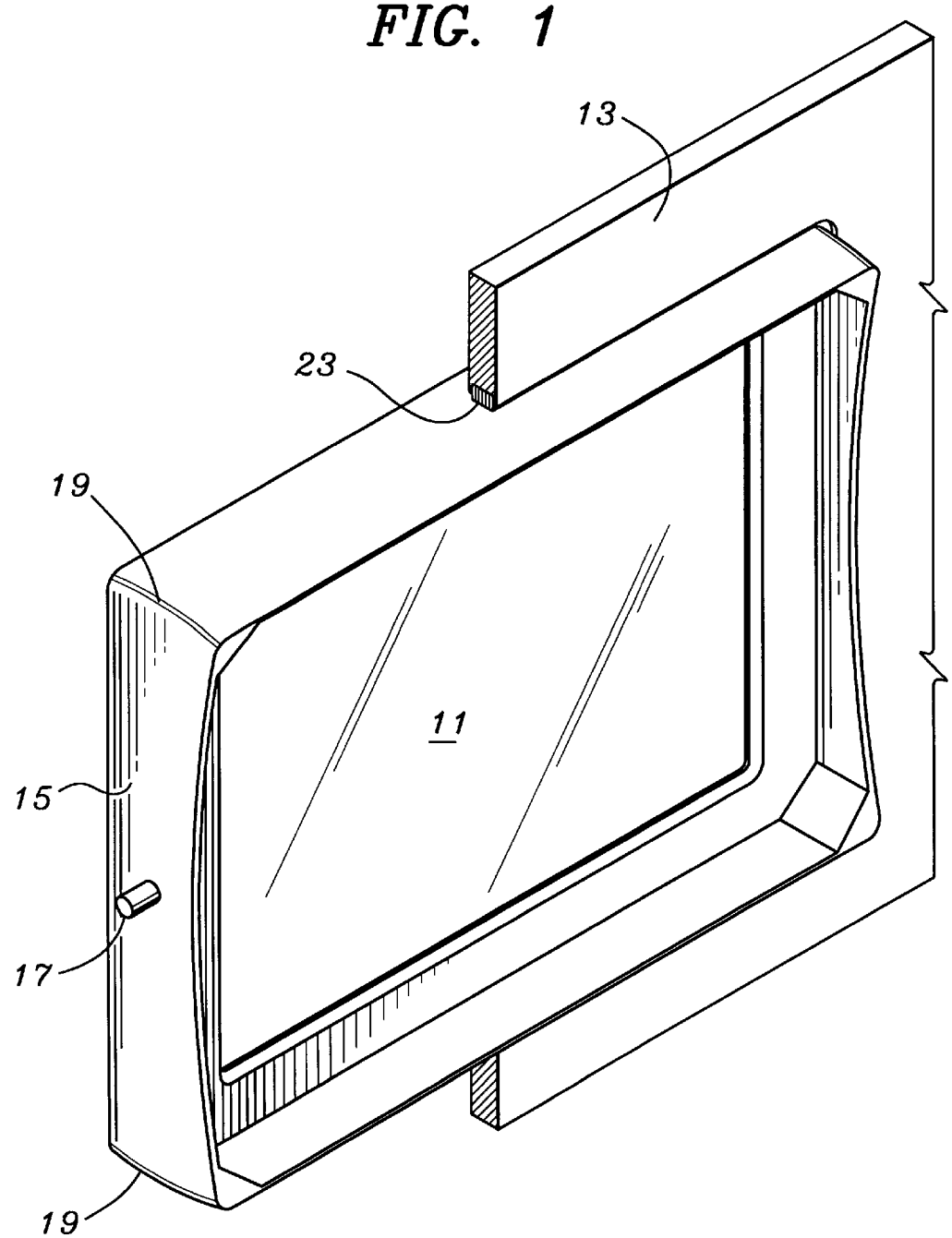
FIG. 1 is a front top left isometric view of the present invention with the cabinet wall structure shown partially cutaway.

Referring now to FIG. 1, display screen 11 is mounted within bezel 15. Bezel 15 includes axle 17 which is rotatably engaged with cabinet wall 13. The bezel includes arcuate contoured top and bottom surfaces 19 having a constant radius of curvature about the axis of rotation defined by axle 17. Seal means 23 is affixed to the cabinet wall located around the entire periphery of the bezel and fills the gap between the bezel and the cabinet wall 13.

Figure 2:
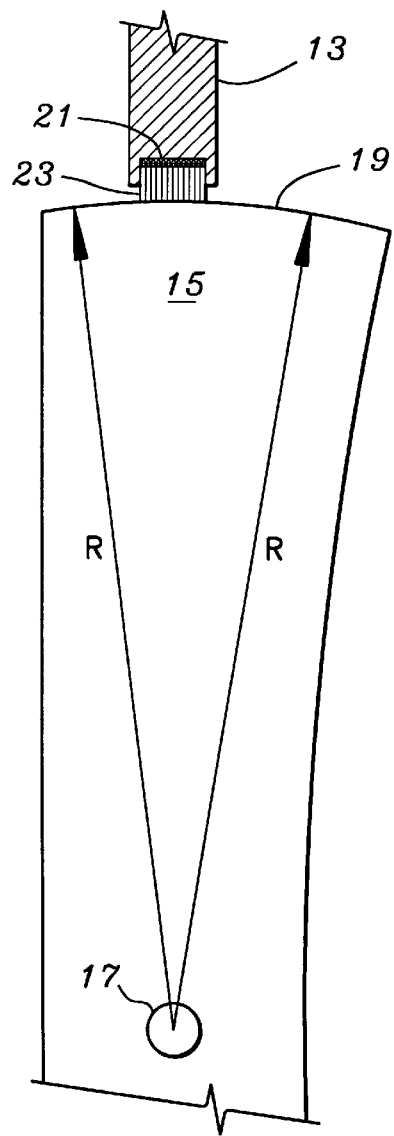
FIG. 2 is a side sectional view taken from FIG. 1 as shown in that figure.

Referring now to FIG. 2, greater detail of the relationship between the bezel and the cabinet wall is shown. As depicted in this figure, the top surface of the bezel is shaped along a constant radius of curvature "R" centered at the axis of rotation defined by axle 17. The cabinet wall 13 includes a central groove 21 which encircles the entire periphery of the bezel. Seal 23 in this case preferably a pile seal, is fitted into the groove 21 and is dimensioned to completely fill the gap between the cabinet wall and the top of the bezel. This seal material may be affixed within the groove of the cabinet wall by an adhesive. Although not shown in this figure, it will be readily understood that the bottom of the bezel is similarly radiused and the various structures along the bottom of the bezel are a mirror image of those shown in this figure. Along the vertical sides of the bezel, the gap is similarly filled by the seal material.

Figure 3:
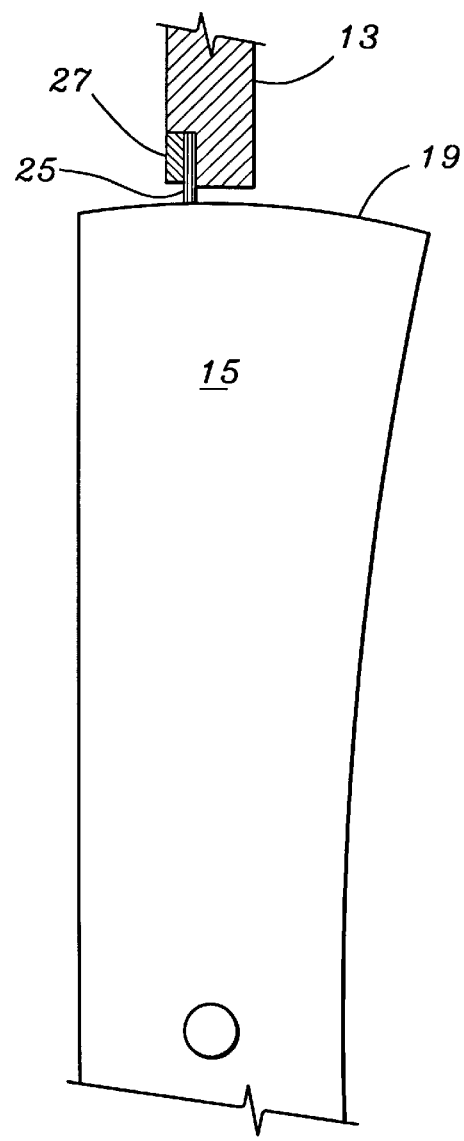
FIG. 3 is a side sectional view of an alternate embodiment.

Referring now to FIG. 3, an alternate embodiment of the present invention is shown. Bezel 15 carries the same radius as described with regard to FIG. 2, however, the cabinet wall structure includes different seal means. In this embodiment, an elastomeric seal 25 in the form of a large flat gasket which encompasses the rectangular periphery of the bezel is secured within a recess in the back side of wall panel 13 and is secured thereto by clamp means 27. By using this structure and maintaining a close tolerance between the bezel and the cabinet wall (about 0.005 inches), a NEMA 12 quality seal can be achieved. This would provide, for example, efficient sealing against water spray.

Although the preferred embodiment shows the tilting display bezel to be mounted directly into the cabinet wall as yet another alternate embodiment, the tilting display bezel may be mounted into a flat panel providing a stationary outer bezel which would then be mounted against the face of a cabinet wall having an appropriate cutout. The use of the double-bezel sub-assembly would, for example, provide the ability to mount the present invention in a cabinet having very thin walls, the necessary thickness for receiving the pile seal or clamping the gasket being supplied by the stationary outer bezel which could be of any desired thickness. In either embodiment the operation of the tilting display is the same.

It should be understood that the above description discloses specific embodiments of the present invention and are for purposes of illustration only. There may be other modifications and changes obvious to those of ordinary skill in the art that fall within the scope of the present invention which should be limited only by the following claims and their legal equivalents. For example, the tilt frame assembly may include any type of viewing element other than an LCD display screen. It may include any other type of display or, for example, a window which permits the viewing of the interior of the enclosure. The present invention has many advantages where it is desired to have a viewing element that can easily be positioned to avoid unwanted glare.

What is claimed is:

1. A tilt frame display screen, comprising:
   a sealed enclosure having a front wall with a cutout therein;
   a bezel mounted within said cutout rotatable about an axis, said bezel having arcuately formed top and bottom surfaces with a radius of curvature taken from the axis of rotation;
   seal means mounted to said front wall which completely fills all spaces between said bezel and said front wall when said bezel is tilted throughout a limited range of rotation defined by the edges of said top and bottom surfaces; and
   a display screen mounted within said bezel.

2. The tilt frame display screen of claim 1, wherein said axis is horizontal.

3. The tilt frame display screen of claim 2, wherein said horizontal axis is located across the middle of said cutout.

4. The tilt frame display screen of claim 1, further including two axles, one affixed to each vertical side surface, said axles rotatably secured to said front wall.

5. The tilt frame display screen of claim 4, wherein said seal means is pile seal.

6. The tilt frame display screen of claim 5, wherein said seal means is an elastomeric gasket.

7. The tilt frame display screen of claim 5, further including a groove in said wall encircling said cutout, said pile seal being located within said groove.

8. The tilt frame display screen of claim 1, wherein said display screen is a LCD display screen.

9. The tilt frame display screen of claim 5, wherein said elastomeric gasket is located within a recess in the back side of said wall.

10. The tilt frame display screen of claim 9, wherein said elastomeric gasket is secured to the back side of said wall by clamp means.

11. A tiltable viewing element, comprising:
    a sealed enclosure having a front wall with a cutout therein;
    a bezel mounted within said cutout rotatable about a horizontal axis located across the middle of said cutout, said bezel having arcuately formed top and bottom surfaces with a radius of curvature taken from the axis of rotation;
    seal means mounted to said front wall which completely fills all spaces between said bezel and said front wall when said bezel is tilted throughout a limited range of rotation defined by the edges of said top and bottom surfaces; and
    a viewing element mounted within said bezel.

12. The tiltable viewing element of claim 11, wherein said element is a window.

13. A tilt frame display screen, comprising:
    a flat panel having a cutout therein forming a stationary outer bezel intended for installation into the wall of a sealed enclosure;
    a second bezel mounted within said cutout rotatable about a horizontal axis located across the middle of said cutout, said second bezel having arcuately formed top and bottom surfaces with a radius of curvature taken from the axis of rotation;
    seal means mounted to said outer bezel which completely fills the spaces between said outer bezel and said rotatable second bezel when said outer bezel is tilted throughout a limited range of rotation defined by the top and bottom surfaces of said second bezel; and
    a display screen mounted within said second bezel.

14. The tilt frame display screen of claim 13, wherein said seal means is pile seal.

15. The tilt frame display screen of claim 14, further including a groove encircling said cutout in said panel, said pile seal being located within said groove.

* * * * *